United States Patent [19]

Harriman et al.

[11] Patent Number: 5,696,768

[45] Date of Patent: Dec. 9, 1997

[54] METHOD AND APPARATUS FOR DATA STORAGE ARRAY TRACKING

[75] Inventors: David J. Harriman, Sacramento; Aditya Sreenivas, Folsom; Russell W. Dyer, El Dorado Hills, all of Calif.

[73] Assignee: Intel Corporation, Santa Clara, Calif.

[21] Appl. No.: 763,963

[22] Filed: Dec. 10, 1996

[51] Int. Cl.$^6$ ................................................ G06F 11/00
[52] U.S. Cl. ................................................ 371/21.1
[58] Field of Search .................. 371/21.1, 40.1, 371/40.4; 395/72; 364/231.8, 238.4, 239.3, 243.2, 244.3

[56] References Cited

U.S. PATENT DOCUMENTS 5,218,680  6/1993  Farrell et al. .................. 395/325
5,592,648  1/1997  Schultz et al. .................. 395/441

Primary Examiner—Vincent P. Canney
Attorney, Agent, or Firm—Kenyon & Kenyon

[57] ABSTRACT

A data storage array is provided having a number, n, of sequential data storage areas for the storage of data. A valid status array including n bits is provided where there is a one to one correspondence between the bits of the valid status array and the data storage areas of the data storage array. When valid data are written into a data storage area, the status bit of the valid status array corresponding to this data storage area is set to indicate that valid data are present. When data are read out of the data storage area, the corresponding status bit is cleared indicating the absence of valid data. If the data storage array is one that is written to in a random access manner and read from sequentially, as a queue, then the valid status array would indicate the presence of valid data at the head of the queue for the data storage array.

21 Claims, 4 Drawing Sheets

METHOD AND APPARATUS FOR DATA STORAGE ARRAY TRACKING

BACKGROUND OF THE INVENTION

The present invention pertains to a method and apparatus for data storage array status tracking, and more particularly to a method and apparatus for tracking the validity of the contents of a data storage array, buffer or other memory device for a given operation using a valid status array.

In certain computer architectures or the like, a data storage array or multiple element storage buffer is provided that may be written to in a so-called random-access manner (where data is written to the buffer in a sequential or non-sequential manner), but is read from in order as a queue. An example of this is the read data return path in the Advanced Graphics Port (A.G.P.) Interface Specification (Revision 1.0, © 1996, Intel Corporation). In certain read operations according to the A.G.P. specification, transactions on the A.G.P. bus must take place in the same order commands were issued but where it may be desirable to run transactions to the system memory, DRAM (Dynamic Random Access Memory), in a different order so as to minimize page breaks, maximizing DRAM bandwidth.

Referring to FIG. 1, an example of a computer architecture utilizing an A.G.P. interface is shown. The A.G.P. interface 12 typically exists between an A.G.P. master component 11 and an A.G.P. target component 13. Examples of an A.G.P. master component includes a 3D graphics controller or a graphics accelerator. The A.G.P. target component is typically the core logic or chip set used to implement a Peripheral Component Interconnect (PCI) bus (e.g., an 82430 or 82440 series chip set designed and manufactured by Intel Corporation, Santa Clara, Calif.).

An example of A.G.P. interface 12 is shown in FIG. 2, which includes a standard PCI bus 31 (Version 2.1, 1995, PCI Special Interest Group, Portland, Oreg.). The A.G.P. interface 12 may also include a sideband address port (SBA) for passing address and command information from master component 11 to target component 13. A status (ST) bus provides information from an arbiter within target component 13 to master component 11 indicating what transactions may be accomplished (e.g., requested read data are being returned to master component 11). Grant (GNT) and Request (REQ) signal lines are provided which can be used separately or in combination to facilitate the transfer of data between master component 11 and target component 13. PIPE is a signal line that indicates a pipelined request by master component 11 to target component 13. There are two methods of queuing requests by master component 11. The first is by using the PIPE signal to indicate to target component 13 that a request (e.g., to read data) appears on the address/data lines of PCI bus 31. The second is through the SBA port. A more detailed description of the A.G.P. interface can be found in the above referenced A.G.P. specification.

As an example, master component 11 may desire to execute several read operations of various address ranges in system memory 19 of FIG. 1 (e.g., Dynamic Random Access Memory (DRAM)). Using the PIPE signal line or using the SBA port, master component 11 sends a string of read requests to target component 13 where each request can include an address and an amount of data requested. The read requests are "disconnected" from the return of data in that the read data are not returned immediately in response to a read request but are returned at a later time allowing other read requests to be sent in the interim. The target component accesses system memory 19 via a memory controller 18 which places the requested data in a read data return queue 17 in an A.G.P./memory bridge 33 coupled between memory controller 18 and A.G.P. interface 12. When target component 13 has placed the requested data in the read data return queue 17 it asserts the GNT signal to master component 11 and indicates on the ST bus the nature of the data that is available (e.g., requested read data). Referring back to FIG. 1, A.G.P. target component 13 includes a host-PCI bridge 15 which serves as an interface with a second PCI bus 21 and one or more Input/Output devices 22a–c coupled thereto (e.g., a Small Computer Standard Interface (SCSI) host bus adapter, a local area network (LAN) adapter, etc.). A PCI-PCI bridge 16 may be provided to serve as an interface between second PCI bus 21 and A.G.P. interface 12. A processor 37, such as a Pentium® processor manufactured by Intel Corporation, Santa Clara, Calif., can be coupled to A.G.P. target component 13 in a known manner.

As mentioned at the outset, the A.G.P. target component receives several read requests in a sequential order. However, when accessing the system memory, it may be more efficient to access data in an order different from the order the read requests were received. The requested read data are placed into read data return queue 17 in a random-access fashion in an order that may be different from the order of the received requests. According to the A.G.P. Interface Specification, however, the read data must be returned in the order that the read requests were received at target component 13. Thus, the read data return queue operated according to the A.G.P. Interface Specification is an example of a data storage array or multiple element storage buffer that may be written to in a random-access manner, but is read from in order, as in a queue.

SUMMARY OF THE INVENTION

According to the present invention, a data storage array status tracking apparatus and method is provided. The apparatus of the present invention includes a data storage array having n data storage areas capable of storing data where data are written to the data storage areas in a random access manner and data are read sequentially from the data storage areas of the data storage array. A valid status array storing n status bits is also provided, where there is a one-to-one correspondence between the status bits and the data storage areas of the data storage array. Each status bit indicates whether valid data are contained in its corresponding data storage area. Accordingly, whether valid data exist in a particular data storage area can be ascertained from the valid status array.

DETAILED DESCRIPTION

Figure 3:
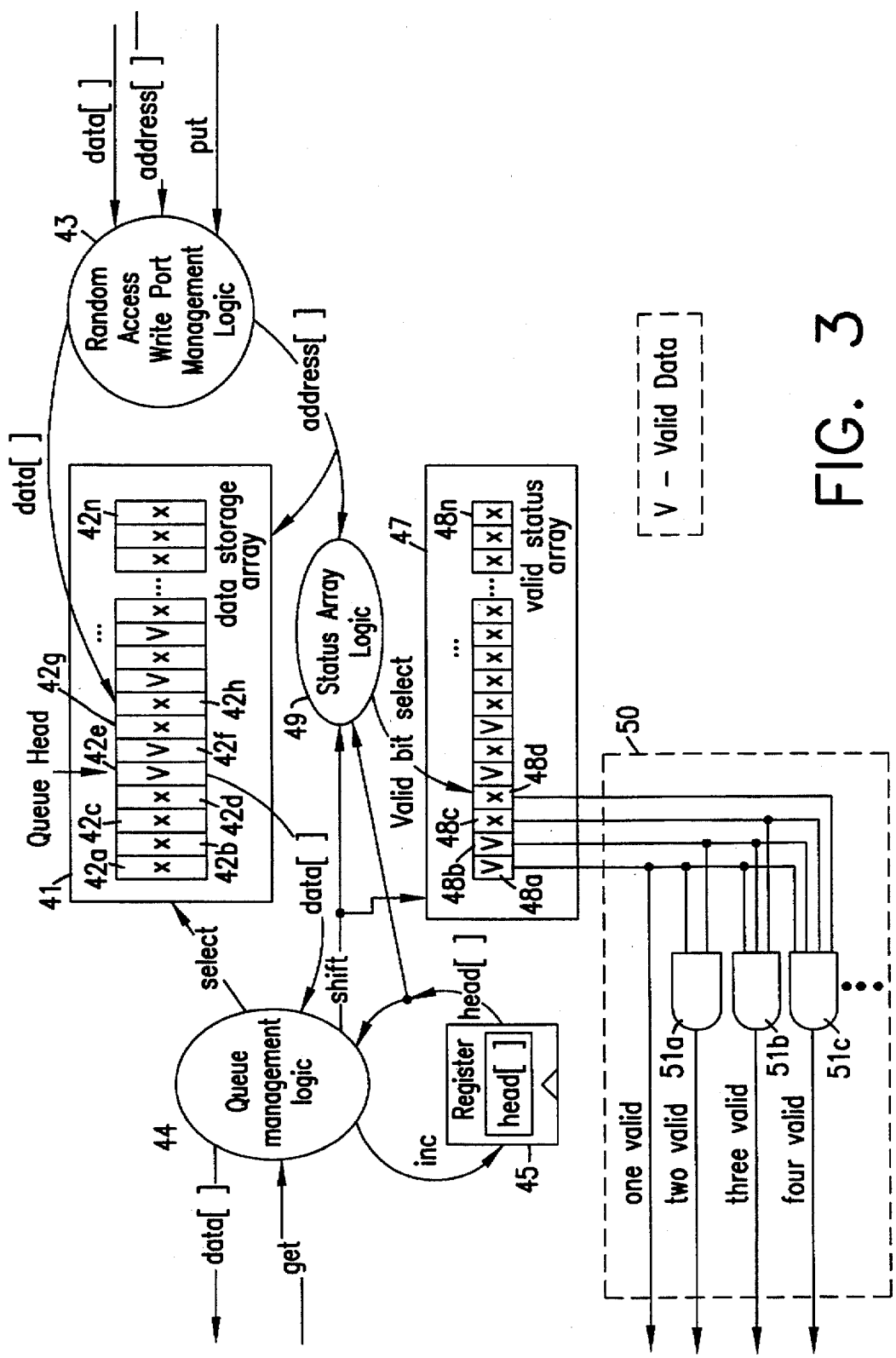
FIG. 3 is a block diagram of a data storage array status tracking apparatus constructed and operated according to an embodiment the present invention.

Referring to FIG. 3, an apparatus is depicted for tracking data storage array status. A data storage array 41 (e.g., a multiple element storage buffer) is provided having a number of sequential data storage areas 42a, b, . . . , n, each storing a unit of information. In this example, each data storage area 42a–n has an associated address and each stores one quad-word or 8 bytes of data. Data are written to data storage array 41 in a random-access manner and read from data storage array 41 in a sequential order. Random access write port management logic 43 is provided for placing data to be read into appropriate storage areas 42a–n in data storage array 41. The write port 43 can receive a command, such as PUT, to indicate that the associated data are to be placed into the selected address or location (referencing an associated data storage area 42a–n). Queue management logic 44 is provided which fetches data from data storage array 41 in response to a GET command, for example. The queue management logic 44 selects and retrieves the data from the appropriate data storage area 42a–n based on a current head pointer value. In this embodiment, the head pointer value is stored in a register 45. If n data storage areas 42a–n are provided and n=32, then the head pointer can be a five bit value where the associated address for data storage area 42a is 00000 and for data storage area 42n is 11111.

According to the present invention, a valid status array 47 having a number, n, of status bits is provided. In this embodiment, valid status array 47 is an n-bit shift register comprising bits 48a, b, . . . , n. There is a one-to-one correspondence between the bits 48a–n and the data storage areas 42a–n. For example, if head pointer 45 has a head pointer value of 00100 pointing to data storage area 42e, then the first bit 48a of valid status array 47 would reflect the status of data storage area 42e. Accordingly, bit 48b corresponds to data storage area 42f, and so on in a cyclical manner. The setting of the values for the bits 48a–n of valid status array 47 will be described with reference to data storage area 42h in FIG. 3. When write port logic 43 writes valid data to the data storage area 42h (address 00111 in this example), the address is supplied to status array logic 49 so that the appropriate status bit 48a–n is set in valid status array 47. The status array logic 49 computes the location of the appropriate status bit to select by subtracting the head pointer value stored in register 45 from the address supplied by write port logic 43. It is assumed that the leftmost bit 48a of valid status array 47 resides at location 0 and the rightmost bit 48n resides at location n–1 (31 in this example). In the example shown in FIG. 3, the head pointer value is 00100 (pointing to data storage area 42e) and the write port logic is writing to address 00111 (data storage area 42h). Therefore, status bit 48d at location 3 (00111–00100) is set by status array logic 49 to reflect that valid data has been placed into data storage area 42h. In the embodiment shown in FIG. 3, a "V" (e.g., a binary "1" value) indicates valid data and an "x" (e.g., a binary "0" value) indicates invalid data.

As data are read from data storage array 41 in a sequential manner, the head pointer is incremented to point to the new head data storage area. For example, in FIG. 3, when the data are read from data storage area 42e (location 00100), the head pointer value in register 45 is incremented to point to data storage area 42f (location 00101). The valid status array 47 is shifted one bit to the left so that status bit 48a represents the status of the data in data storage area 42f. An invalid value (e.g., an "x" or "0" value) is shifted in at the right for status bit 48n which effectively clears the status bit corresponding to the data storage area that was previously at the head. A valid value (e.g., a "V" or "1") is shifted in at the right for status bit 48n if data are being written into data storage area 42e at the same time that data are being read from that data storage area. Also, if data are being put into data storage array 41 at the same time that data are being read, then the status bit at location [(address)–(head pointer value)+1] is set, so that the valid status array will have the correct alignment following the data being read out of data storage array 41. For example, if data are being read from data storage area 48e (location 00100) at the same time that data are being written to data storage area 48g (location 00110), then the status bit at location 3 is set (i.e., (6)–(4)+1=3), or status bit 48d in the valid status array. The setting of valid status array 47 is summarized as follows:

IF PUT command and not GET command THEN
    set status bit at location [(address)–(head pointer value)] to Valid.
IF GET command THEN
    If PUT command THEN
        set status bit at location [(address)–(head pointer value)+1] to Valid;
    shift bits in valid status array one bit to the left;
    increment head pointer value.

According to a further embodiment of the present invention, the number of data storage areas 42a–n in data storage array 41 containing valid data at the head of the queue can be determined from valid status array 47 using a logic circuit 50. In this example, if the bit at the most significant position (i.e., status bit 48a at location 0) is set to a Valid state, then at least the data storage area pointed to by register 45 contains valid data. One skilled in the art will appreciate that the apparatus of FIG. 3 will work equally as well if the ordering of the status bits 48a . . . n and data storage areas 42a . . . n are reversed so that the most significant position of valid status array 47 is at the rightmost position. If the two bits at the most significant positions (i.e., status bits 48a and 48b at locations 0 and 1, respectively) of valid status array 47 are set to a Valid state, then at least the two data storage areas at the head of data storage array 41 contain valid data. Accordingly, a logic circuit 50 including a first AND gate 51a is provided having two inputs coupled to the two most significant bits 48a, b of valid status array 47. Also, a second AND gate 51b is provided having three inputs coupled to the three most significant bits 48a, b, c of valid status array 47 and a third AND gate 51c is provided having four inputs coupled to the four most significant bits 48a–d of valid status array 47. To summarize, status bit 48a indicates that there are valid data in at least the data storage area at the head of the data storage array, the output of AND gate 51a indicates that there are valid data in at least the two data storage areas at the head of the data storage array 41, the output of AND gate 51b indicates that there is valid data in at least the three data storage areas at the head of data storage array 41, and the output of AND gate 51c indicates that there is valid data in at least the four data storage areas at the head of data storage array 41. Further AND gates can be added to extend this feature from 5 to n valid data storage areas.

Figure 4:
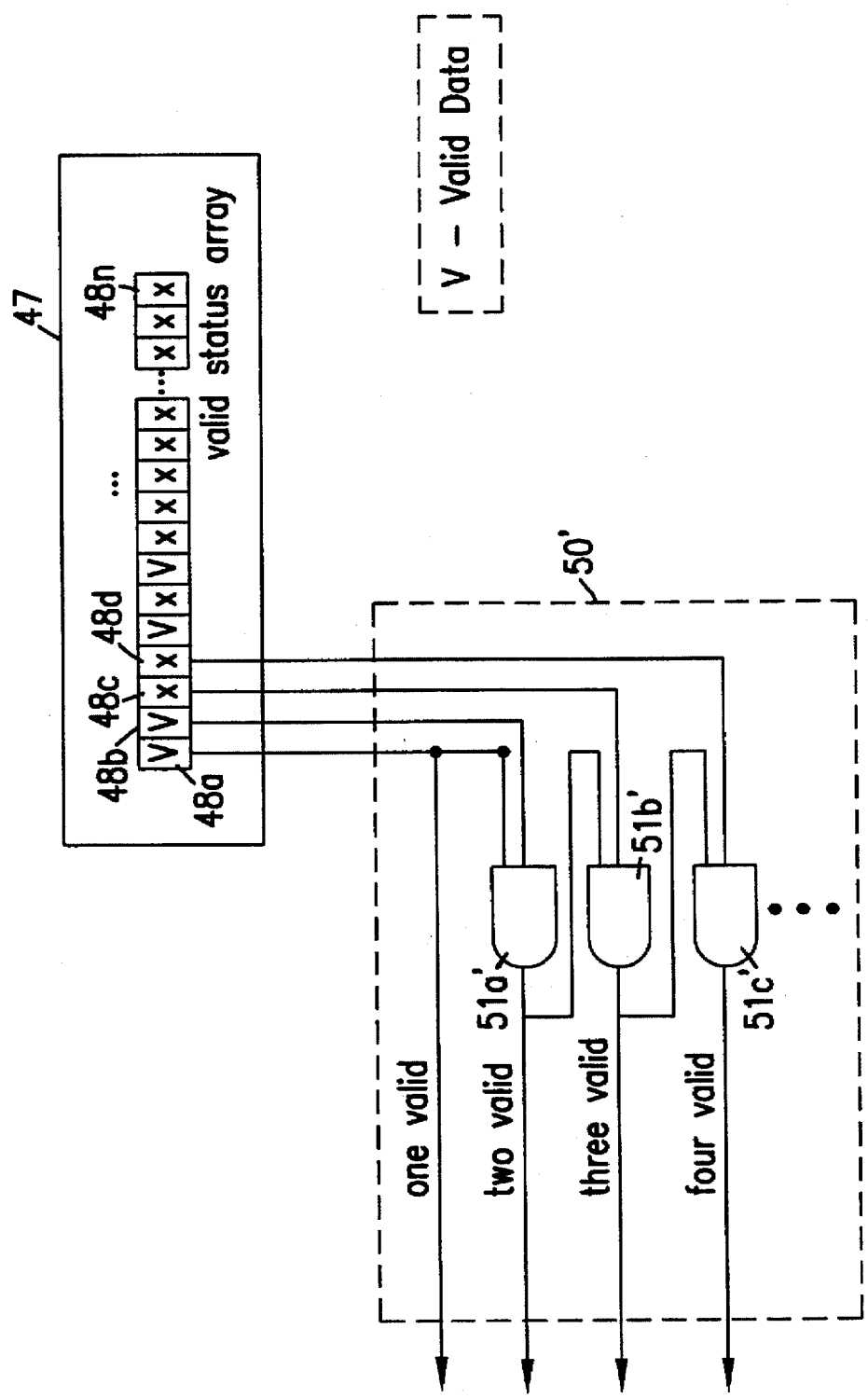
FIG. 4 is an alternative logic circuit for the apparatus of FIG. 3 for providing information on the number of data storage areas at the head of the data storage array that have valid data in them.

If desired, a logic circuit including a series of two-input AND gates coupled together in a cascade manner can be used to supply information as to the number of data storage area at the head of the data storage array that contain valid data. Referring to FIG. 4, logic circuit 50' is shown where AND gates 51b, c are replaced by two-input AND gates 51b' and 51c' (AND gate 51 is coupled similarly to AND gate 51a' in FIG. 4). Coupling the AND gates in a cascading manner reduces the complexity of this feature of the present invention, but does increase gate delay.

Figure 5:
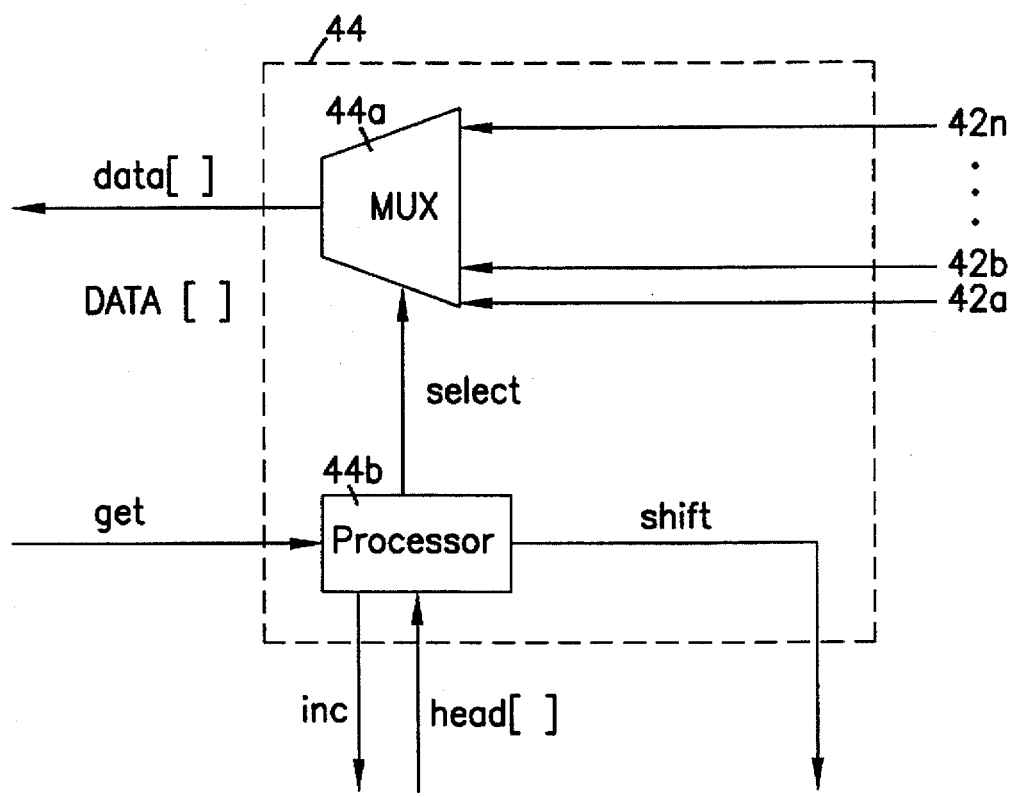
FIG. 5 is a block diagram of an exemplary queue management logic of FIG. 3.

An example of the queue management logic 44 is shown in FIG. 5 which includes a multiplexer (MUX) 44a and a processor 44b. The processor 44b receives the GET command indicating that data are to be read from data storage array 41. The data storage areas 42a–n are coupled to MUX 44a so that data are supplied from the data storage areas to MUX 44a. The output of MUX 44a is selected based on the current value in register 45, as supplied by processor 44b. After the data are sent, an increment (inc) signal is sent to register 45 to increment the head pointer value and a shift signal is sent to status array logic 49 to shift the status bits 48a–n so that they properly correspond to the data areas 42a–n of data storage array 41 (i.e., so the value of status bit 48a corresponds to the data storage area pointed to by the head pointer value).

Figure 6:
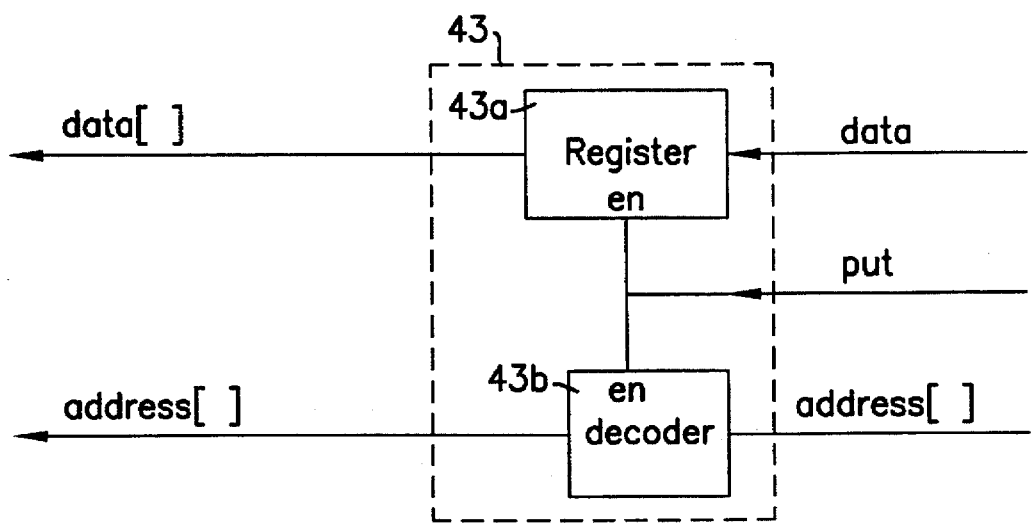
FIG. 6 is a block diagram of an exemplary write port logic of FIG. 3.

An example of the random access write port management logic 43 is shown in FIG. 6 and includes a register 43a and a decoder 43b. The register 43a receives the data to be written to data storage array 41 as well as the PUT command at its enable input. A decoder 43b decodes the address from memory controller 18 (alternatively, the address can be stored internally in A.G.P. control logic 35 of A.G.P./ memory bridge 33 in FIG. 1), for example, into an address for data storage array 41. The decoder also can receive the PUT command as an enable input. Accordingly, when address and data information are available at the write port logic with an asserted PUT command, the data are latched in register 43a and supplied to data storage array 41 with the appropriate address from decoder 43b (which is also supplied to the status array logic).

Figure 1:
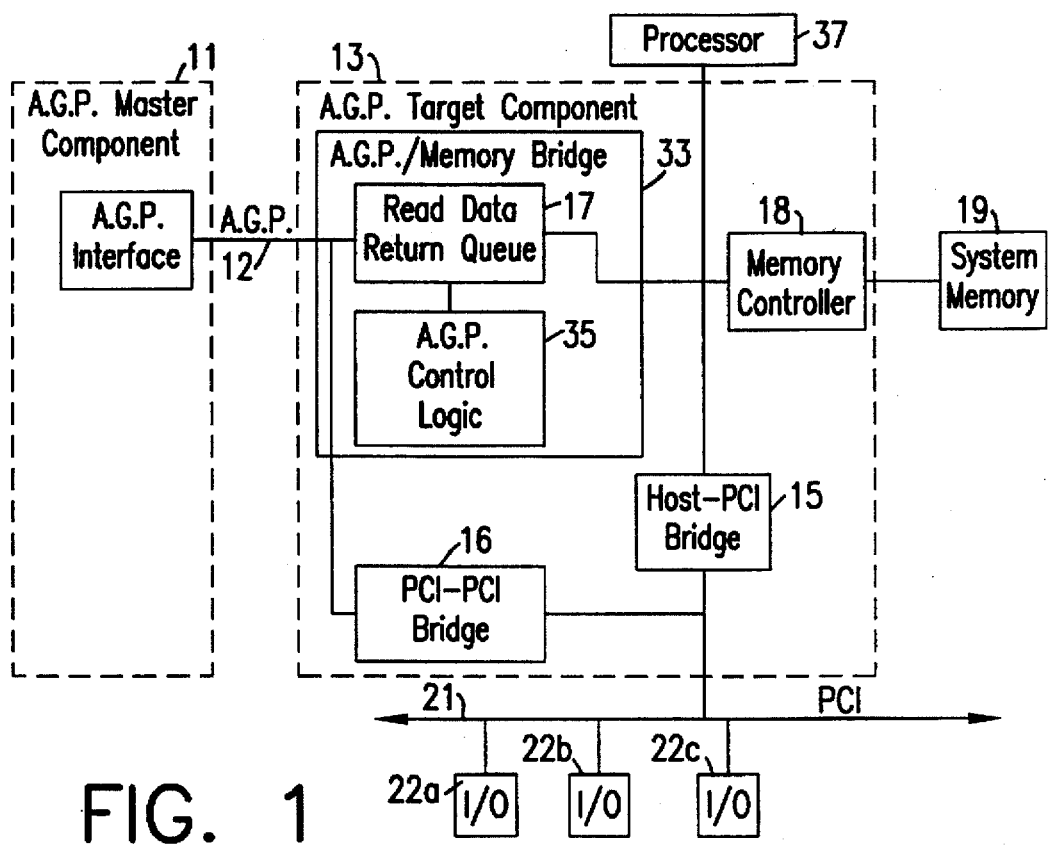
FIG. 1 is a block diagram of a computer system that implements an A.G.P. interface as known in the art.
Figure 2:
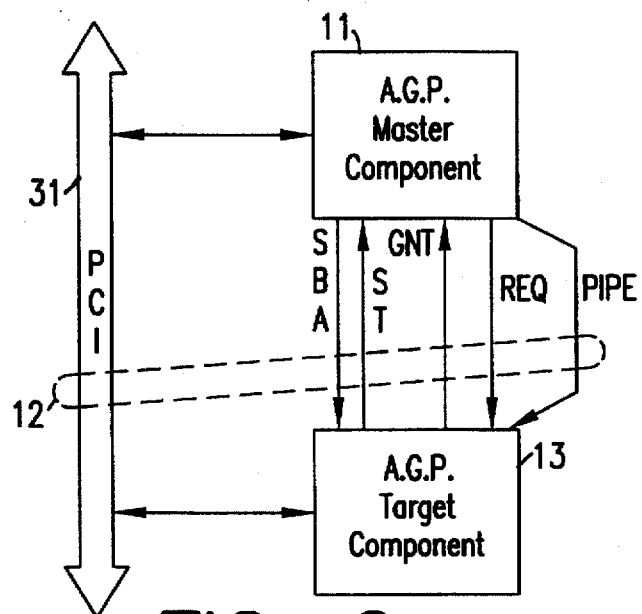
FIG. 2 is a block diagram of the A.G.P. interface between a master component and a target component as known in the art.

The method and apparatus for buffer status tracking described above can be used in the A.G.P. environment, where the apparatus shown in FIG. 3 resides in read data return queue 17 of FIG. 1. As stated above a typical read request from A.G.P. master component 11 (FIG. 1) states an address and an amount of data requested. The amount requested will typically be multiples of the size of a single data storage area 42a–n in data storage array 41 (FIG. 3). According to the A.G.P. specification, initiating and continuing a transaction over A.G.P. interface 12 requires knowledge of the validity of data in the data storage area at the head of data storage array 41 as well as subsequent data storage areas. The embodiments of the present invention described above, provide this knowledge thus improving the operation of A.G.P. interface 12.

The method and apparatus for buffer status tracking can be used in any other applications where the buffer is written to in a random-access fashion and read in sequential order. Examples include a LAN or telephone interface which includes an assembly buffer that may be loaded with data packets in a random-access fashion but are required to be read out of the buffer in a specific order. Although several embodiments are specifically illustrated and described herein, it will be appreciated that modifications and variations of the present invention are covered by the above teachings and within the purview of the appended claims without departing from the spirit and intended scope of the invention. For example, one skilled in the art will appreciate that the apparatus of FIG. 3 can be implemented in a variety of other designs such as a microcontroller executing code.

What is claimed is:

1. A data storage array status tracking apparatus comprising:

a data storage array including n data storage areas capable of storing data where data are written to the data storage areas of said data storage array in a random access manner and data are read sequentially from the data storage areas of said data storage array; and a valid status array storing n status bits, where there is a one-to-one correspondence between said status bits and the data storage areas of said data storage array, each status bit indicating whether valid data are contained in its corresponding data storage area.

2. The apparatus of claim 1 wherein when data are written to a first one of the data storage areas of said data storage array, a first one of said status bits corresponding to said first one of the data storage areas is set to indicate that said first one of the data storage areas contains valid data.

3. The apparatus of claim 2 wherein when data are read from the first one of the data storage areas of said data storage array, the first one of said status bits corresponding to said first one of the data storage areas is cleared to indicate that said first one of the data storage areas does not contain valid data.

4. The apparatus of claim 1 further comprising:

a logic circuit having a plurality of inputs coupled to said valid status array and at least one output, said logic circuit indicating a number of data storage areas in said data storage array containing valid data.

5. The apparatus of claim 3 further comprising:

a logic circuit having a plurality of inputs coupled to said valid status array and at least one output, said logic circuit indicating a number of data storage areas in said data storage array containing valid data.

6. The apparatus of claim 1 wherein said valid status array is a shift register, where a most significant status bit of said valid status array corresponds to a next data storage area to be read from said data storage array.

7. The apparatus of claim 3 wherein said valid status array is a shift register, where a most significant status bit of said valid status array corresponds to a next data storage area to be read from said data storage array.

8. The apparatus of claim 4 wherein said valid status array is a shift register, where a most significant status bit of said valid status array corresponds to a next data storage area to be read from said data storage array.

9. A method of tracking a status of a data storage array including a plurality of data storage areas where data are written to the data storage array in a random access manner and data are read from the data storage array sequentially, the method comprising:

(a) storing data in a first data storage areas of said data storage array;

(b) setting a first status bit in a valid status array storing n status bits, where there is a one-to-one correspondence between said status bits and the data storage areas of said data storage array and said first status bit corresponds to said first data storage area, such that each of said status bits indicates whether valid data are contained in its corresponding data storage area; and (c) reading data out of the first data storage area of said data storage array.

10. The method of claim 9 further comprising:

(d) clearing said first status bit in said valid status array to indicate that said first one of the data storage areas does not contain valid data.

11. The method of claim 10 wherein the data storage areas of the data storage array are in a sequential order and data are sequentially read out of the data storage areas of the data storage array.

12. The method of claim 9 further comprising:

(d) generating an indication of a number of data storage areas in said data storage array containing valid data at at least one output of a logic circuit having a plurality of inputs coupled to the valid status array.

13. The method of claim 10 further comprising:

(e) generating an indication of a number of data storage areas in said data storage array containing valid data at at least one output of a logic circuit having a plurality of inputs coupled to the valid status array.

14. The method of claim 11 further comprising:

(e) generating an indication of a number of data storage areas in said data storage array containing valid data at at least one output of a logic circuit having a plurality of inputs coupled to the valid status array.

15. The method of claim 11 wherein said valid status array is a shift register, and a most significant status bit of said valid status array corresponds to a next data storage area to be read from said data storage array, the method further comprising:

(e) shifting said shift register one bit place, such that the most significant status bit of said valid status array corresponds to the next data storage area to be read from said data storage array.

16. The method of claim 14 wherein said valid status array is a shift register, and a most significant status bit of said valid status array corresponds to a next data storage area to be read from said data storage array, the method further comprising:

(f) shifting said shift register one bit place, such that the most significant status bit of said valid status array corresponds to the next data storage area to be read from said data storage array.

17. An apparatus for tracking status of a data storage array in an Advanced Graphics Port (A.G.P.) Interface comprising:

an A.G.P. target component having a read data return queue including:

a data storage array including n data storage areas capable of storing data, where data are written to the data storage areas of said data storage array in a random access manner and data are read sequentially from the data storage areas of said data storage array; and a valid status array storing n status bits, where there is a one-to-one correspondence between said status bits and the data storage areas of said data storage array, where each status bit indicates whether valid data are contained in its corresponding data storage area; and an A.G.P. master component coupled to the read data return queue of said A.G.P. target component via an A.G.P. interface, said A.G.P. master component capable of receiving data stored in said data storage array via said A.G.P. interface.

18. The apparatus of claim 17 wherein when data are written to a first one of the data storage areas of said data storage array, a first one of said status bits corresponding to said first one of the data storage areas is set to indicate that said first one of the data storage areas contains valid data.

19. The apparatus of claim 18 wherein when data are read from the first one of the data storage area of said data storage array, the first one of said status bits corresponding to said first one of the data storage areas is cleared to indicate that said first one of the data storage areas does not contain valid data.

20. The apparatus of claim 19 where the read data return queue further comprises:

a logic circuit having a plurality of inputs coupled to said valid status array and at least one output, said logic circuit indicating a number of data storage areas in said data storage array containing valid data.

21. The apparatus of claim 20 wherein said valid status array is a shift register, where a most significant status bit of said valid status array corresponds to a next data storage area to be read from said data storage array.

* * * * *